US007721042B2

(12) United States Patent
Cypher (10) Patent No.: US 7,721,042 B2
(45) Date of Patent: *May 18, 2010

(54) CONTENT-ADDRESSABLE MEMORY THAT SUPPORTS A PRIORITY ORDERING BETWEEN BANKS OF DIFFERING SIZES

(75) Inventor: Robert E. Cypher, Saratoga, CA (US)

(73) Assignee: Oracle America, Inc., Redwood Shores, CA (US)

( * ) Notice: Subject to any disclaimer, the term of this patent is extended or adjusted under 35 U.S.C. 154(b) by 848 days.

This patent is subject to a terminal disclaimer.

(21) Appl. No.: 11/495,451

(22) Filed: Jul. 27, 2006

(65) Prior Publication Data

US 2008/0028138 A1 Jan. 31, 2008

(51) Int. Cl.
*G06F 12/00* (2006.01)
*G06F 13/00* (2006.01)
*G06F 13/28* (2006.01)

(52) U.S. Cl. ............... 711/108; 711/216; 365/49.1; 365/189.011

(58) Field of Classification Search .................. 711/108
See application file for complete search history.

(56) References Cited

U.S. PATENT DOCUMENTS

| 6,175,513 B1* | 1/2001 | Khanna ............... 365/49.17 |
| 6,697,276 B1* | 2/2004 | Pereira et al. ......... 365/49.17 |
| 7,469,243 B2* | 12/2008 | Mori et al. ............... 707/3 |
| 7,502,245 B2* | 3/2009 | McKenzie et al. ...... 365/49.17 |
| 2002/0169920 A1* | 11/2002 | Kanno et al. ............. 711/3 |
| 2003/0235099 A1* | 12/2003 | Mori et al. .............. 365/202 |
| 2004/0042241 A1* | 3/2004 | McKenzie et al. ......... 365/49 |

OTHER PUBLICATIONS

Hamid R. Zarandi et al., "A fault-tolerant cache architecture based on binary set partitioning", Microelectronics Reliability 46 (2006), pp. 86-99, available at www.sciencedirect.com.
Publication: "*A Case for Two-Way Skewed-Associative Caches*" by Andre Seznec, Proceedings of the 20th International Symposium on Computer Architecture (IEEE-ACM), San Diego, May 1993, http://www.irisa.fr/caps.

* cited by examiner

*Primary Examiner*—Brian R Peugh
*Assistant Examiner*—Prasith Thammavong
(74) *Attorney, Agent, or Firm*—Park, Vaughan & Fleming LLP (57) ABSTRACT

One embodiment of the present invention provides a system that implements a content-addressable memory (CAM) which has multiple banks. During operation, the system receives a request to insert an item into the CAM, wherein the request includes a key which is used to index the item and a body containing data. Next, for each bank in the CAM, the system calculates a different hash function based on the key to produce an index and a tag. The system then uses the calculated index and the tag for each bank to lookup an entry in each bank. If the lookups do not generate a hit in any bank, the system stores an entry for the request into a highest priority bank which does not contain a valid entry in the location accessed by the lookup. In one embodiment of the present invention, the multiple banks in the CAM have varying sizes.

23 Claims, 6 Drawing Sheets

CONTENT-ADDRESSABLE MEMORY THAT SUPPORTS A PRIORITY ORDERING BETWEEN BANKS OF DIFFERING SIZES

RELATED APPLICATION

The subject matter of this application is also related to the subject matter in a co-pending non-provisional application by the same inventor as the instant application and filed on the same day as the instant application entitled, "Content-Addressable Memory that Supports a Priority Ordering between Banks of Differing Sizes" having Ser. No. 11/495,852.

BACKGROUND

1. Field of the Invention

The present invention relates to the design of content-addressable memories (CAMs) within computer systems. More specifically, the present invention relates to the design of a CAM with multiple banks that achieves a high average capacity by implementing a priority ordering for insertions into the multiple banks.

2. Related Art

Content-Addressable Memories (CAMs) are used for many purposes in computer systems. For example, CAMs are routinely used to implement commonly-occurring structures in computer systems, such as cache memories, store queues and translation-lookaside buffers (TLBs). However, as computer system performance continues to increase, such CAM structures need to become larger to deal with the performance-limiting effects of growing memory latencies.

However, as CAMs become larger, it is no longer practical to use a "fully-associative" CAM design which has a separate comparator for each memory element. Instead, it is more efficient to use a "set-associative" design, which uses "index bits" in the address to partition the memory elements into subsets, and which provides a small fully-associative memory for each subset. Unfortunately, in cases where the CAM must store everything the system attempts to store (such as in a store queue), if any one of these small fully-associative memories exceeds its capacity, the system has to stall. This "capacity problem" can be somewhat alleviated by using a skewed-associative cache design, which uses a different hash function from each memory bank in the CAM (see A. Seznec, "A Case for Two-Way Skewed-Associative Caches, *Proceedings of the 20th International Symposium on Computer Architecture*, San Diego, Calif., May 1993.) However, in spite of the advantages of the skewed-associative design, the capacity problem still remains.

Hence, what is needed is a practical CAM design that efficiently handles the capacity problem.

SUMMARY

One embodiment of the present invention provides a system that implements a content-addressable memory (CAM) which has multiple banks. During operation, the system receives a request to insert an item into the CAM, wherein the request includes a key which is used to index the item and a body containing data. Next, for each bank in the CAM, the system calculates a different hash function based on the key to produce an index and a tag. The system then uses the calculated index and the tag for each bank to lookup an entry in each bank. If the lookups generate a hit in a given entry in a given bank, the system stores the body of the request into the given entry. Otherwise, if the lookups do not generate a hit in any bank, the system stores an entry for the request into a highest priority bank which does not contain a valid entry in the location accessed by the lookup.

In a variation on this embodiment, if the lookups do not generate a hit in any bank, and if the CAM contains valid entries in all locations accessed by the lookups, the system either: (1) returns a fail signal; or (2) replaces a valid entry in the CAM with an entry for the request.

In a variation on this embodiment, the system additionally receives a request to lookup an item in the CAM, wherein the request includes a key which is used to index the item. In response to this request, for each bank in the CAM, the system calculates a different hash function based on the key to produce an index and a tag. Next, the system uses the calculated index and tag for each bank to lookup an entry in each bank. If the lookups generate a hit in a given entry in a given bank, the system returns the body of the given entry. Otherwise, if the lookups do not generate a hit in any bank, the system returns a fail signal.

In a variation on this embodiment, the system additionally receives a request to delete an item from the CAM, wherein the request includes a key which is used to index the item. In response to this request, for each bank in the CAM, the system calculates a different hash function based on the key to produce an index and a tag. Next, the system uses the calculated index and tag for each bank to lookup an entry in each bank. If the lookups generate a hit in a given entry in a given bank, the system invalidates the given entry. Otherwise, if the lookups do not generate a hit in any bank, the system returns a fail signal.

In a variation on this embodiment, each entry in each bank contains: (1) a tag which is used to index the entry; (2) a body containing data; and (3) a valid flag which indicates whether or not the entry is valid.

In a variation on this embodiment, while using the calculated index and tag to look up an entry in a bank, if a valid flag in the entry indicates the entry is valid, the system compares a tag contained in the entry against the calculated tag. If the tag contained in the entry matches the calculated tag, the system generates a hit signal.

In a variation on this embodiment, the banks of the CAM are numbered consecutively, and the lower-numbered banks have higher priority than the higher-numbered banks.

In a variation on this embodiment, the CAM is used to implement one of the following: a store buffer; a cache memory; a translation-lookaside buffer; a structure that keeps track of outstanding requests to access cache lines for coherence purposes; or a structure that keeps track of cache lines that were read speculatively.

In a variation on this embodiment, the multiple banks in the CAM have varying sizes, and the multiple banks have a priority ordering.

In a further variation, the sizes of the banks fall off exponentially from highest to lowest priority, so that if the CAM is of size Y and has W banks, the banks can have the following sizes, $Y/2, Y/4, Y/8 \ldots, Y/2^{(W-2)}, Y/2^{(W-1)},$ and $Y/2^{(W-1)}$.

In a further variation, the sizes of the banks are constant and then fall off exponentially from highest to lowest priority, so that if the CAM is of size Y and has W banks, the banks can have the following sizes, $Y/4, Y/4, Y/4, Y/8 Y/2^{(W-3)}, Y/2^{(W-2)},$ and $Y/2^{(W-2)}$.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the claims.

Overview

One embodiment of the present invention relates to a CAM, which is implemented using RAM (Random-Access Memory). This CAM is similar to a skewed-associative cache, in that the RAM is divided into separate banks and a different hash function is used to index into each bank. However, unlike a skewed-associative cache, the CAM uses a fixed priority between banks to greatly improve the average capacity of the CAM. In particular, this CAM operates efficiently in applications where the number of items to be stored in the CAM is bounded. (In contrast, a cache implements a CAM in which the system can attempt to store an unbounded number of items.)

In one embodiment of the present invention, the CAM supports operations which use a "key" to index entries in the CAM, and which involve a "body" containing data to be stored in the CAM. The supported operations include:

(1) insert (key, body)—This operation takes a key and body and creates a corresponding entry in the CAM (or returns a failure indication if it cannot do so). If an attempt is made to insert multiple entries into the CAM with the same key value, each such attempt will overwrite previous entries with the matching key value;

(2) delete (key)—This operation takes a key and deletes a corresponding entry in the CAM with a matching key value (or returns a failure indication if no such entry exists); and (3) lookup (key)—This operation takes a key and returns the body of an entry in the CAM with a matching key value (or returns a failure indication if no such entry exists).

These operations are described in more detail below with reference to FIGS. 2-6, but first we describe the underlying computer system.

Computer System

Figure 1:
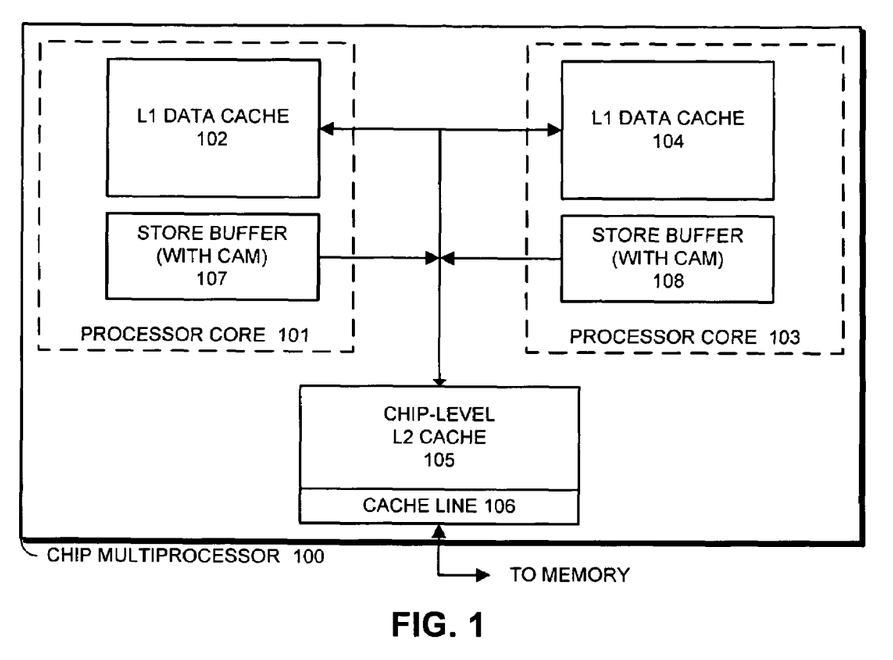
FIG. 1 illustrates a computer system in accordance with an embodiment of the present invention.

FIG. 1 illustrates an exemplary Chip Multi-Processor (CMP) system 100 in accordance with an embodiment of the present invention. CMP 100 is incorporated onto a single semiconductor die, and includes two processor cores, 101 and 103.

Processor cores 101 and 103 include L1 data caches 102 and 104, respectively, and they share L2 cache 105. Along with L1 data caches 102 and 104, processor cores 101 and 103 include store buffers 108 and 107, which buffer pending store operations.

During a store operation by processor core 101, processor core 101 first performs a lookup for the cache line in L1 data cache 102. If the lookup generates a miss in L1 data cache 102, processor core 101 creates an entry for the store in store buffer 107 and sends a corresponding fetch for the store to L2 cache 105.

During a subsequent load operation, processor core 101 uses a CAM structure to perform a lookup in store buffer 107 to locate completed but not-yet-retired stores to the same address that are logically earlier in program order. If such a matching store exists, the load operation obtains its value from that store rather than from the memory system. This CAM structure is described in more detail below with reference to FIGS. 2-6.

CAM Organization for Insert and Delete Operations

Figure 2:
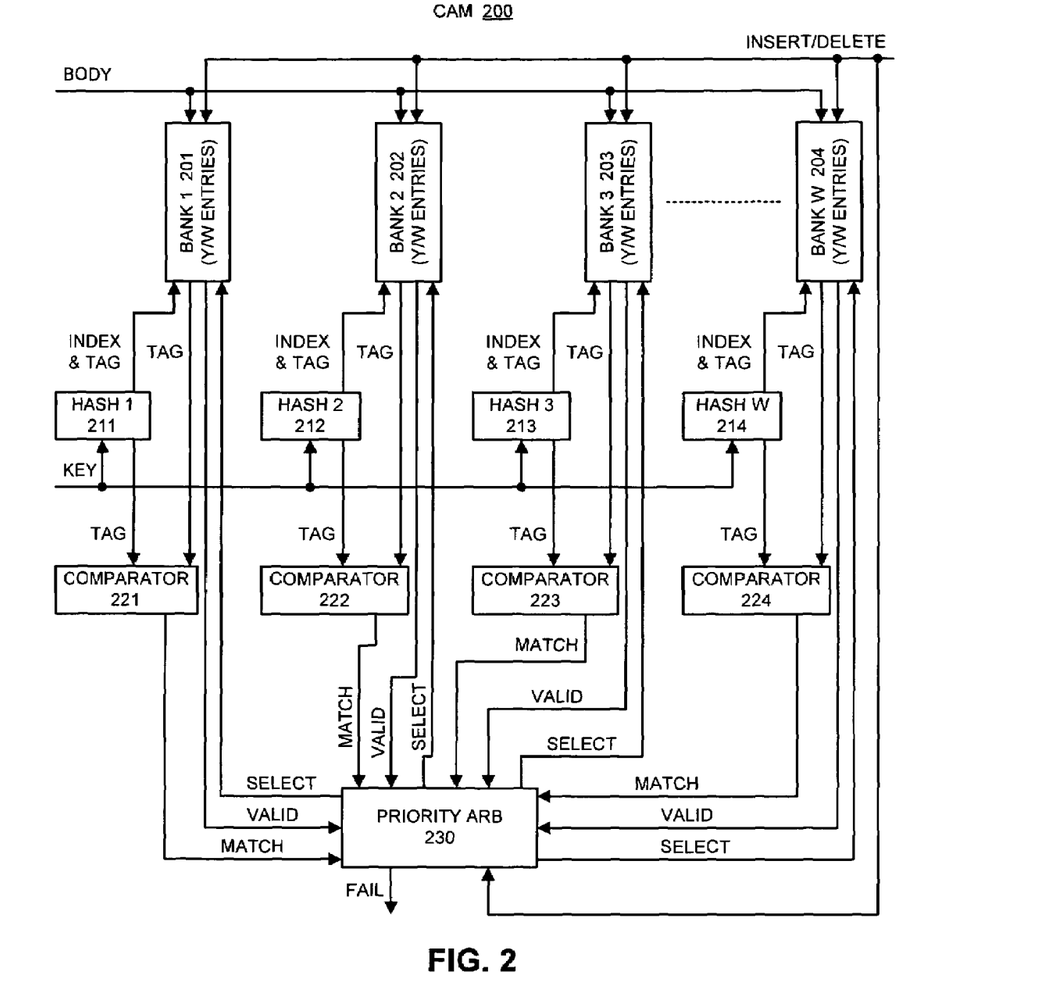
FIG. 2 illustrates a CAM organization for insert and delete operations in accordance with an embodiment of the present invention.

FIG. 2 illustrates a CAM organization for insert and delete operations in accordance with an embodiment of the present invention. In this embodiment, the main storage for the CAM is implemented using RAM which stores a total of Y entries, which are divided into W banks with Y/W entries each. Each of these entries includes a tag (derived from a key via a hash function), a body, and a valid flag.

Each bank includes circuitry that computes a different hash function from a key value for each bank. The output from this hash circuitry provides an index and tag, which are used to perform a lookup into the bank.

Each bank also includes a comparator circuit which compares a tag computed by the hash circuitry with a tag retrieved during the lookup from a corresponding entry in the bank.

A priority arbiter circuit 230 receives match signals from the comparator circuits along with valid bits from the retrieved entries. Priority arbiter circuit 230 uses these inputs to generate select signals, which are used to select entries for insert or delete operations. Priority arbiter circuit 230 also generates a fail signal which indicates that the insert or delete operation has failed.

This entire process is described in more detail below.

CAM Organization for Lookup Operations

Figure 3:
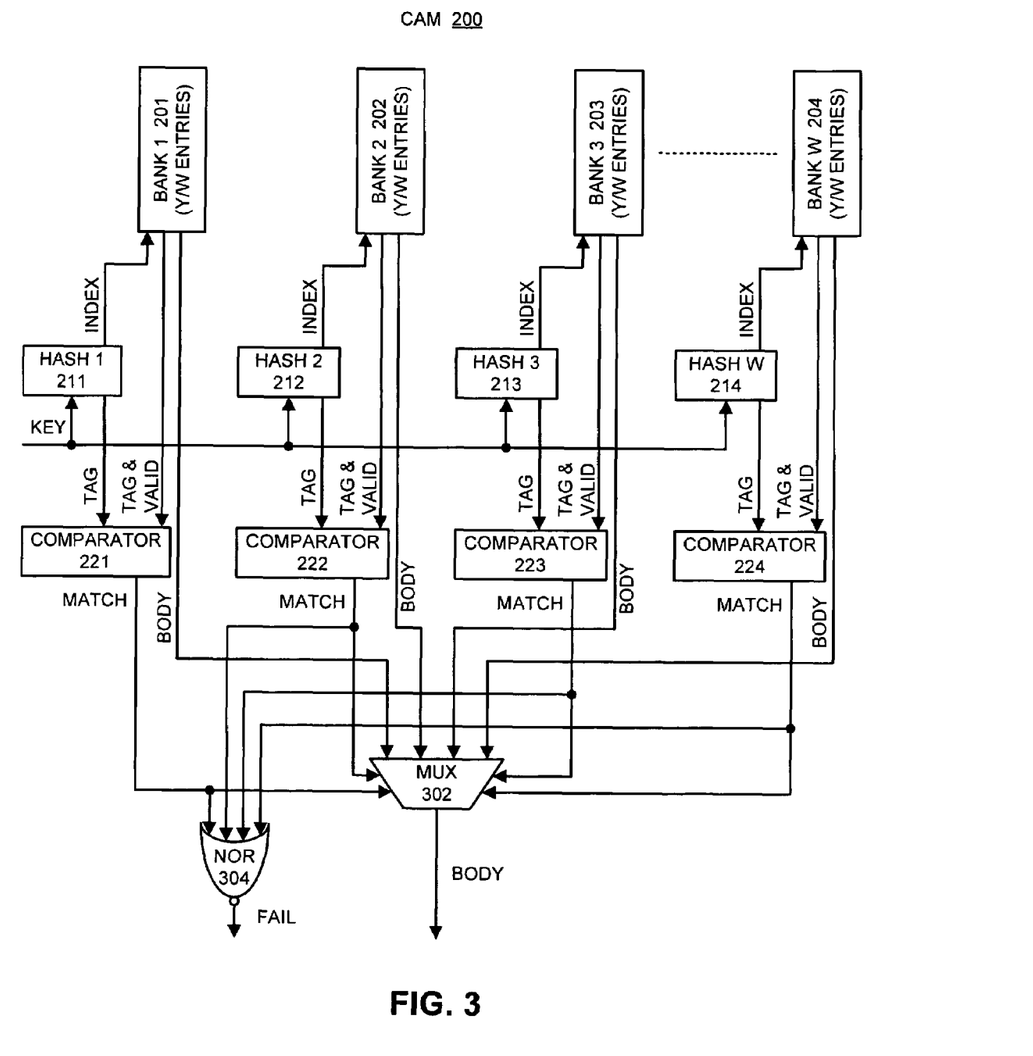
FIG. 3 illustrates a CAM organization for lookup operations in accordance with an embodiment of the present invention.

FIG. 3 illustrates a CAM organization for lookup operations in accordance with an embodiment of the present invention. This embodiment uses the same main storage described above, which stores a total of Y entries divided into W banks with Y/W entries each. It also uses the same circuitry that computes a different hash function from a key value for each bank, and uses comparator circuits which are similar to those used in FIG. 2, except they also receive valid indicators and only signal a match if the valid indicator is asserted. During a lookup operation, the match signals from the comparator circuits control a multiplexer (MUX) 302, which selects a body from one of the entries to return to complete the lookup operation. If no match signal is generated, NOR gate 304 generates a fail signal.

Insert Operation

Figure 4:
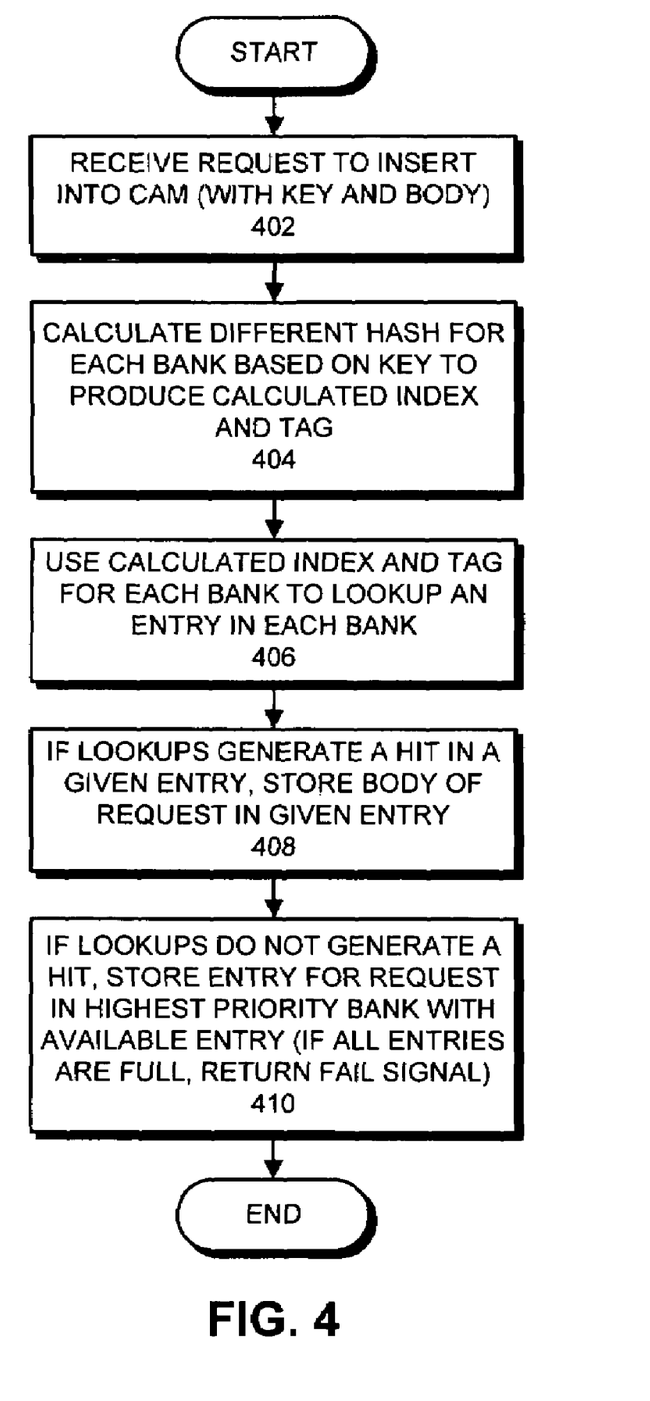
FIG. 4 presents a flow chart illustrating an insert operation in accordance with an embodiment of the present invention.

Referring to the flow chart illustrated in FIG. 4, in one embodiment of the present invention, an insert operation proceeds as follows. First, the system receives a request to insert an item into the CAM (step 402), wherein the request includes a key and a body. The key is passed to the W hash circuits, each of which calculates a different hash function based on the key and uses the result to determine an index and tag for the item (step 404). The index and tag calculated by each hash unit is passed to the corresponding bank to perform a lookup, and an entry with the specified index is read out of the bank (step 406). The valid bit read out of each entry is sent to a priority arbiter. In addition, the tag read out of each entry is compared to the tag generated by the corresponding hash unit. If these match, a hit indicator is sent to the priority arbiter.

The priority arbiter asserts a select signal to the bank into which the item will be inserted (or a fail signal if no such bank exists). Specifically, if there is a hit on a valid entry in some bank X, the priority arbiter asserts the select signal to bank X which causes the body of the request to be stored in the entry (step 408). If no such hit is detected, the priority arbiter asserts the select signal for the lowest numbered bank which does not have a valid entry in the accessed location, and the body and tag of the item to be inserted is written to the specified index of the bank that receives the select signal (step 410). If all entries are full (valid), the system asserts the fail indicator.

Lookup Operation

Figure 5:
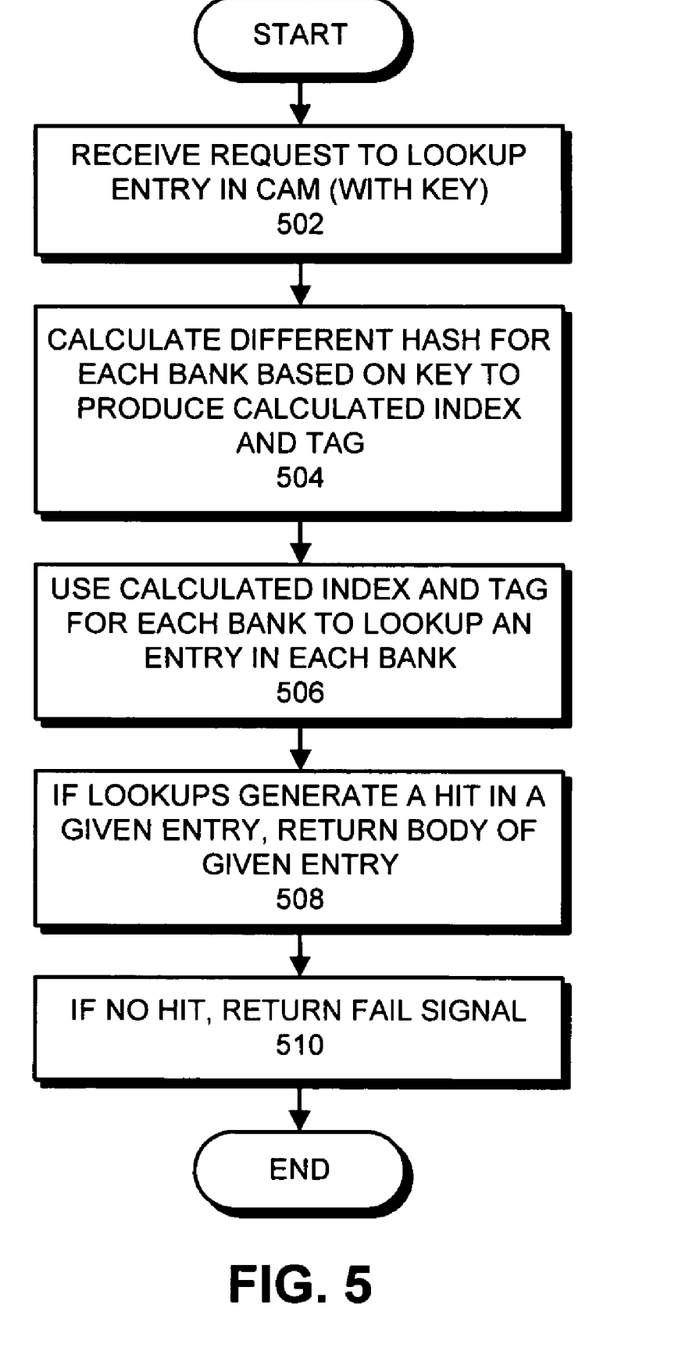
FIG. 5 presents a flow chart illustrating a lookup operation in accordance with an embodiment of the present invention.

Referring to the flow chart illustrated in FIG. 5, in one embodiment of the present invention, a lookup operation proceeds as follows. First, the system receives a request to lookup an item in the CAM (step 502), wherein the request includes a key. The key is passed to W hash units, each of which calculates a different hash function and uses the result to determine an index and tag for the item (step 504). The index and tag calculated by each hash unit is passed to the corresponding bank to perform a lookup, and an entry with the specified index is read out of the bank (step 506).

The tag and valid bit read out of each entry are sent to a corresponding comparator and if the tag from a given valid entry matches the calculated tag, a hit indicator is generated. The hit indicators are used to control a multiplexer (MUX) which selects between the bodies of the entries read from each bank. The selected body is used as the result of the lookup (step 508). If none of the comparators generates a hit, a fail signal is generated (step 510).

Delete Operation

Figure 6:
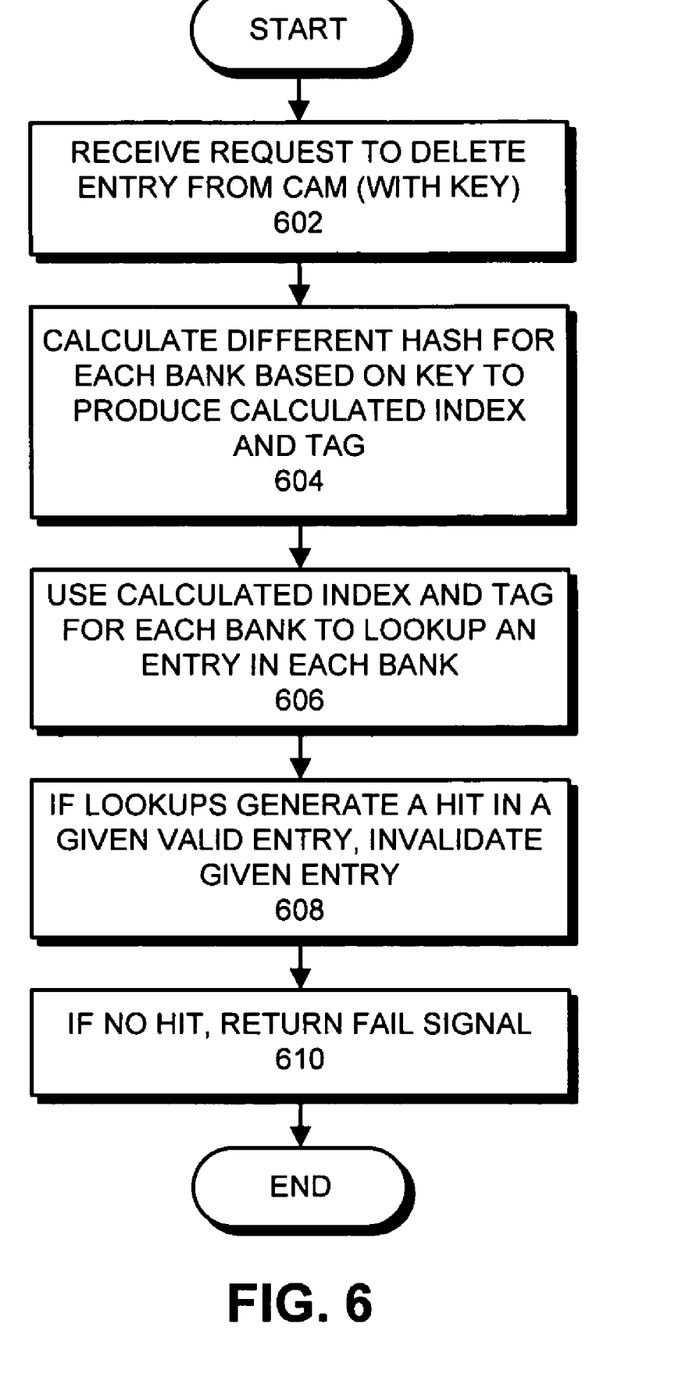
FIG. 6 presents a flow chart illustrating a delete operation in accordance with an embodiment of the present invention.

Referring to the flow chart illustrated in FIG. 6, in one embodiment of the present invention, a delete operation proceeds as follows. First, the system receives a request to delete an item from the CAM (step 602), wherein the request includes a key. The key is passed to the W hash circuits, each of which calculates a different hash function based on the key and uses the result to determine an index and tag for the item (step 604). The index and tag calculated by each hash unit is passed to the corresponding bank to perform a lookup, and an entry with the specified index is read out of the bank (step 606). Next, the valid bit read out of each entry is sent to a priority arbiter. In addition, the tag read out of each entry is compared to the tag generated by the corresponding hash unit. If these match, a hit indicator is sent to the priority arbiter.

The priority arbiter asserts a select signal to the bank from which the item will be deleted (or a fail signal if no such bank exists). Specifically, if there is a hit on a valid entry in some bank X, the priority arbiter asserts the select signal to bank X. This select signal causes the corresponding entry from bank X to be invalidated (step 608). If no such hit is detected, a fail indicator is generated (step 610).

Varying Bank Sizes

While the above CAM design has much better performance than either a standard set-associative or skewed-associative design, it is possible to improve the performance of this CAM design by varying the sizes of the banks. In general, with equal-sized banks the lower-numbered banks will be significantly more full than the higher-numbered banks. As a result, it is possible to scale the sizes of the banks so that higher numbered banks are smaller than (or in some cases equal to) lower numbered banks to increase the number of items that can be stored in the CAM. However, care must be taken in selecting the sizes of the banks, because an inability to store an item in the highest-numbered bank has a higher cost (namely the determination that the capacity of the CAM has been reached) than an inability to store an item in a lower-numbered bank.

A number of different techniques for scaling the bank sizes can be used. For example, in one technique, the sizes of the banks fall off exponentially from highest to lowest priority, so that if the CAM is of size Y and has W banks, the banks can have the following sizes, $Y/2, Y/4, Y/8 \ldots, Y/2^{(W-2)}, Y/2^{(W-1)}$, and $Y/2^{(W-1)}$. In another technique, the sizes of the banks are constant and then fall off exponentially from highest to lowest priority, so that if the CAM is of size Y and has W banks, the banks can have the following sizes, $Y/4, Y/4, Y/4, Y/8$ $Y/2^{(W-3)}, Y/2^{(W-2)}$, and $Y/2^{(W-2)}$.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. An apparatus, comprising:
  a content-addressable memory (CAM) which has multiple banks;
  wherein the multiple banks have varying sizes and a priority ordering, and wherein the multiple banks have varying sizes that fall off in a predetermined pattern from highest to lowest priority, wherein in the predetermined pattern, the sizes of the banks fall off exponentially from highest to lowest priority or the sizes of the banks are constant in size and then fall off exponentially from highest to lowest priority;
  an insertion mechanism, wherein upon receiving an insertion request which includes a key and a body, the insertion mechanism is configured to,
    calculate a different hash function for each bank based on the key to produce a calculated index and tag for each bank,
    use the calculated index and the tag for each bank to lookup an entry in each bank, and
    if the lookups do not generate a hit in any bank, to store an entry for the request into a highest priority bank which does not contain a valid entry in the location accessed by the lookup.

2. The apparatus of claim 1, wherein if the lookups generate a hit in a given entry in a given bank, the insertion mechanism is configured to store the body of the request into the given entry.

3. The apparatus of claim 1, wherein the sizes of the banks fall off exponentially from highest to lowest priority, so that if the CAM is of size Y and has W banks, the multiple banks can have the following sizes: $Y/2, Y/4, Y/8 \ldots, Y/2^{(W-2)}, Y/2^{(W-1)}$, and $Y/2^{(W-1)}$.

4. The apparatus of claim 1, wherein the sizes of the banks are constant in size and then fall off exponentially from highest to lowest priority, so that if the CAM is of size Y and has W banks, the multiple banks can have the following sizes: $Y/4, Y/4, Y/4, Y/8 \ldots, Y/2^{(W-3)}, Y/2^{(W-2)}$, and $Y/2^{(W-2)}$.

5. The apparatus of claim 1, wherein if the lookups do not generate a hit in any bank, and if the CAM contains valid entries in all locations accessed by the lookups, the insertion mechanism is configured to:
return a fail signal; or to
replace a valid entry in the CAM with an entry for the request.

6. The apparatus of claim 1, wherein the apparatus further comprises a lookup mechanism, wherein upon receiving a lookup request which includes a key, the lookup mechanism is configured to:
calculate a different hash function for each bank based on the key to produce a calculated index and tag for each bank;
use the calculated index and the tag for each bank to lookup an entry in each bank;
if the lookups generate a hit in a given entry in a given bank, to return the body of the given entry; and
otherwise, if the lookups do not generate a hit in any bank, to return a fail signal.

7. The apparatus of claim 1, wherein the apparatus further comprises a deletion mechanism, wherein upon receiving a deletion request which includes a key, the deletion mechanism is configured to:
calculate a different hash function for each bank based on the key to produce a calculated index and tag for each bank;
use the calculated index and the tag for each bank to lookup an entry in each bank;
if the lookups generate a hit in a given entry in a given bank, to invalidate the given entry; and
otherwise, if the lookups do not generate a hit in any bank, to return a fail signal.

8. The apparatus of claim 1, wherein each entry in each bank contains:
a tag which is used to index the entry;
a body containing data; and
a valid flag which indicates whether or not the entry is valid.

9. The apparatus of claim 1, wherein while using the calculated index and tag for a bank to look up an entry in the bank, if a valid flag in the entry indicates the entry is valid, the apparatus is configured to:
compare a tag contained in the entry against the calculated tag; and
if the tag contained in the entry matches the calculated tag, to generate a hit signal.

10. The apparatus of claim 1,
wherein the banks of the CAM are numbered consecutively; and
wherein the lower-numbered banks have higher priority than the higher-numbered banks.

11. The apparatus of claim 1, wherein the CAM is used to implement one of the following:
a store buffer;
a cache memory;
a translation-lookaside buffer;
a structure that keeps track of outstanding requests to access cache lines for coherence purposes; or
a structure that keeps track of cache lines that were read speculatively.

12. A method for accessing a content-addressable memory (CAM), comprising:
receiving a request to insert an item into the CAM, wherein the request includes a key which is used to index the item and a body containing data;
wherein the CAM has multiple banks with varying sizes and a priority ordering, and wherein a set of the multiple banks have varying sizes that fall off in a predetermined pattern from highest to lowest priority, wherein in the predetermined pattern, the sizes of the banks fall off exponentially from highest to lowest priority or the sizes of the banks are constant in size and then fall off exponentially from highest to lowest priority;
for each bank in the CAM, calculating a different hash function based on the key to produce an index and a tag;
using the calculated index and the tag for each bank to lookup an entry in each bank; and
if the lookups do not generate a hit in any bank, storing an entry for the request into a highest priority bank which does not contain a valid entry in the location accessed by the lookup.

13. The method of claim 12, wherein if the lookups generate a hit in a given entry in a given bank, the method further comprises storing the body of the request into the given entry.

14. The apparatus of claim 12, wherein the sizes of the banks fall off exponentially from highest to lowest priority, so that if the CAM is of size Y and has W banks, the multiple banks can have the following sizes: $Y/2, Y/4, Y/8 \ldots, Y/2^{(W-2)}, Y/2^{(W-1)}$, and $Y/2^{(W-1)}$.

15. The apparatus of claim 12, wherein the sizes of the banks are constant and then fall off exponentially from highest to lowest priority, so that if the CAM is of size Y and has W banks, the multiple banks can have the following sizes: $Y/4, Y/4, Y/4, Y/8 \ldots, Y/2^{(W-3)}, Y/2^{(W-2)}$, and $Y/2^{(W-2)}$.

16. The method of claim 12, wherein if the lookups do not generate a hit in any bank, and if the CAM contains valid entries in all locations accessed by the lookups, the method further comprises:
returning a fail signal; or
replacing a valid entry in the CAM with an entry for the request.

17. The method of claim 12, wherein the method further comprises:
receiving a request to lookup an item in the CAM, wherein the request includes a key which is used to index the item;
for each bank in the CAM, calculating a different hash function based on the key to produce an index and a tag;
using the calculated index and tag for each bank to lookup an entry in each bank;
if the lookups generate a hit in a given entry in a given bank, returning the body of the given entry; and
otherwise, if the lookups do not generate a hit in any bank, returning a fail signal.

18. The method of claim 12, wherein the method further comprises:
receiving a request to delete an item from the CAM, wherein the request includes a key which is used to index the item;
for each bank in the CAM, calculating a different hash function based on the key to produce an index and a tag;
using the calculated index and tag for each bank to lookup an entry in each bank;
if the lookups generate a hit in a given entry in a given bank, invalidating the given entry; and
otherwise, if the lookups do not generate a hit in any bank, returning a fail signal.

19. The method of claim 12, wherein each entry in each bank contains:
a tag which is used to index the entry;
a body containing data; and a valid flag which indicates whether or not the entry is valid.

20. The method of claim 12, wherein while using the calculated index and tag for a bank to look up an entry in the bank, if a valid flag in the entry indicates the entry is valid, the method further comprises:

comparing a tag contained in the entry against the calculated tag; and if the tag contained in the entry matches the calculated tag, generating a hit signal.

21. The method of claim 12, wherein the banks of the CAM are numbered consecutively; and wherein the lower-numbered banks have higher priority than the higher-numbered banks.

22. The method of claim 12, wherein the CAM is used to implement one of the following:

a store buffer;

a cache memory;

a translation-lookaside buffer;

a structure that keeps track of outstanding requests to access cache lines for coherence purposes; or a structure that keeps track of cache lines that were read speculatively.

23. A computer system, comprising:

a processor;

a memory;

a content-addressable memory (CAM) which has multiple banks;

wherein the multiple banks have varying sizes and a priority ordering, and wherein a set of the multiple banks have varying sizes that fall off in a predetermined pattern from highest to lowest priority, wherein in the predetermined pattern, the sizes of the banks fall off exponentially from highest to lowest priority or the sizes of the banks are constant in size and then fall off exponentially from highest to lowest priority;

an insertion mechanism within the CAM, wherein upon receiving an insertion request which includes a key and a body, the insertion mechanism is configured to, calculate a different hash function for each bank based on the key to produce a calculated index and tag for each bank, use the calculated index and the tag for each bank to lookup an entry in each bank, and if the lookups do not generate a hit in any bank, to store an entry for the request into a highest priority bank which does not contain a valid entry in the location accessed by the lookup.

\* \* \* \* \*

UNITED STATES PATENT AND TRADEMARK OFFICE
CERTIFICATE OF CORRECTION

PATENT NO. : 7,721,042 B2  
APPLICATION NO. : 11/495451  
DATED : May 18, 2010  
INVENTOR(S) : Robert E. Cypher Page 1 of 1

It is certified that error appears in the above-identified patent and that said Letters Patent is hereby corrected as shown below:

In column 2, line 61, delete "Y/8Y/2" and insert -- Y/8..., Y2 --, therefor.

In column 2, line 18-19, delete "Y/8Y/2" and insert -- Y/8..., Y2 --, therefor.

Signed and Sealed this  
Nineteenth Day of July, 2011

David J. Kappos  
*Director of the United States Patent and Trademark Office*